United States Patent [19]

Nakamura et al.

[11] Patent Number: 4,932,249

[45] Date of Patent: Jun. 12, 1990

[54] SPEEDOMETER FOR MARINE VESSELS

[75] Inventors: Kazuhiro Nakamura, Hamamatsu; Ryoji Sawada; Tomoji Nakamura, both of Iwata, all of Japan

[73] Assignees: Sanshin Kogyo Kabushiki Kaisha, Hamamatsu; Yamaha Hatsudoki Kabushiki Kaisha, Iwata, both of Japan

[21] Appl. No.: 423,662

[22] Filed: Oct. 18, 1989

Related U.S. Application Data

[63] Continuation of Ser. No. 160,124, Feb. 25, 1988, abandoned.

[30] Foreign Application Priority Data

Feb. 27, 1987 [JP] Japan .................... 62-44365

[51] Int. Cl.$^5$ ............................................. G01C 21/10
[52] U.S. Cl. ..................................................... 73/182
[58] Field of Search ................. 73/181, 182, 183, 189, 73/861.72, 861.71, 861.74, 861.69, 861.73, DIG. 4

[56] References Cited

U.S. PATENT DOCUMENTS

| 2,627,181 | 2/1953 | Kiekhaefer | 73/182 |
| 4,205,552 | 6/1980 | Refoy | 73/182 |
| 4,694,694 | 9/1987 | Vlakancic et al. | 73/721 |
| 4,759,216 | 7/1988 | Carpenter et al. | 73/182 |

Primary Examiner—Donald O. Woodiel
Attorney, Agent, or Firm—Ernest A. Beutler

[57] ABSTRACT

A speedometer form watercraft wherein a speed signal is derived from a water pressure signal which is transmitted to the indicator through a conduit so that long electrical lines are not required.

4 Claims, 3 Drawing Sheets

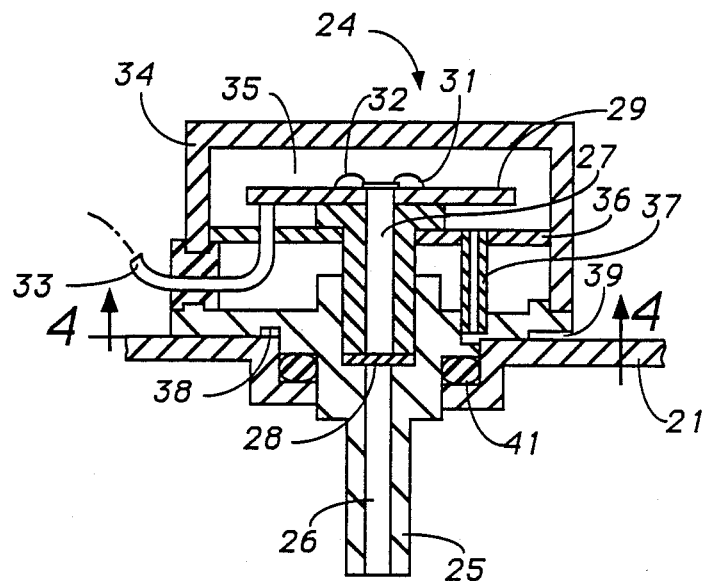
_Fig-3_
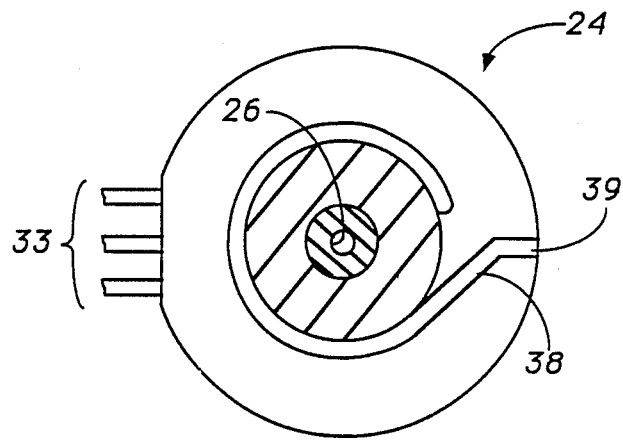
_Fig-4_

4,932,249

SPEEDOMETER FOR MARINE VESSELS

This is a continuation of U.S. patent application Ser. No. 160,124, filed Feb. 25, 1988 now abandoned.

BACKGROUND OF THE INVENTION

This invention relates to a speedometer for marine vessels and more particularly to an improved, simplified and highly effective arrangement for indicating the speed of a watercraft.

There are a number of types of speed indicators employed for watercraft. These devices all operate on electrical principals and include either the propeller type wherein a propeller is mounted on the hull and rotates at a speed which will be related to the speed of the hull or of the magnetic current meter type. Such magnetic current meter type devices also are provided on the exterior of the hull and each system requires the provision of connecting wires for transmitting a signal from the sensor to a remotely positioned indicator. However, the accuracy of such devices depends on the effectiveness of the transmission of the electrical signal from the remotely positioned speed transducer to the speed indicator positioned in proximity to the watercraft operator. As a result, these devices tend to be inaccurate.

It is, therefore, a principal object of this invention to provide an improved speed indicator for a watercraft. It is a further object of this invention to provide a watercraft speed indicator that can be used with a wide variety of vessels and which will provide an accurate speed signal regardless of the type or size of the vessel with which the unit is used.

It is a further object of this invention to provide a speedometer for a watercraft wherein electrical signals need not be transmitted over long distances.

SUMMARY OF THE INVENTION

This invention is adapted to be embodied in a water speed indicator for a watercraft that is comprised of a hull. Means are carried by the hull and define an opening to receive water pressure generated by the movement of the hull through the water. Conduit means transmit the water pressure from the opening to a remote position at which a combined sensor, indicator element is located. The combined sensor, indicator element is comprised of an outer housing that contains a pressure transducer which is in communication with the conduit means for generating an output signal indicative of pressure. Also contained within the outer housing is means for converting the pressure signal into a velocity signal and means for displaying watercraft velocity in response to the velocity signal.

BRIEF DESCRIPTION OF THE DRAWINGS

FIG. 3 is a further enlarged cross-sectional view showing the pressure, speed transducer.

FIG. 4 is a cross sectional view taken along the line 4—4 of FIG. 3.

DETAILED DESCRIPTION OF THE PREFERRED EMBODIMENT OF THE INVENTION

Figure 1:
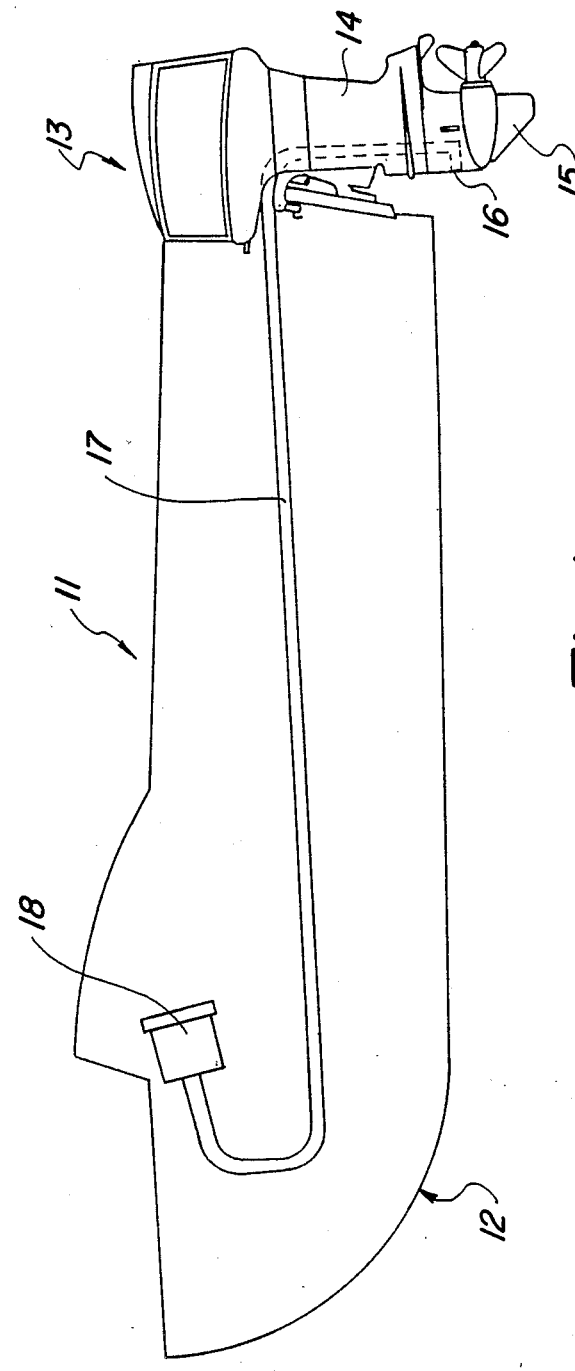
FIG. 1 is a side elevational view of a watercraft incorporating a speedometer constructed in accordance with an embodiment of the invention.

Referring first to FIG. 1, a watercraft constructed in accordance with an embodiment of the invention is identified generally by the reference numeral 11. The watercraft 11 is comprised of a hull indicated generally by the reference numeral 12 and which is propelled by an outboard motor, indicated the reference numeral 13. The outboard motor 13 includes a drive shaft housing 14 which has a lower unit 15 in which a forwardly facing opening 16 is formed.

A conduit 17 is provided for transmitting a water pressure signal from the opening 16 to a combined pressure transducer, speed indicator mechanism, indicated generally by the reference numeral 18. The speed indicator 18 is positioned in the passenger cabin of the watercraft 11 in proximity to the operator for indicating watercraft speed to the operator.

Figure 2:
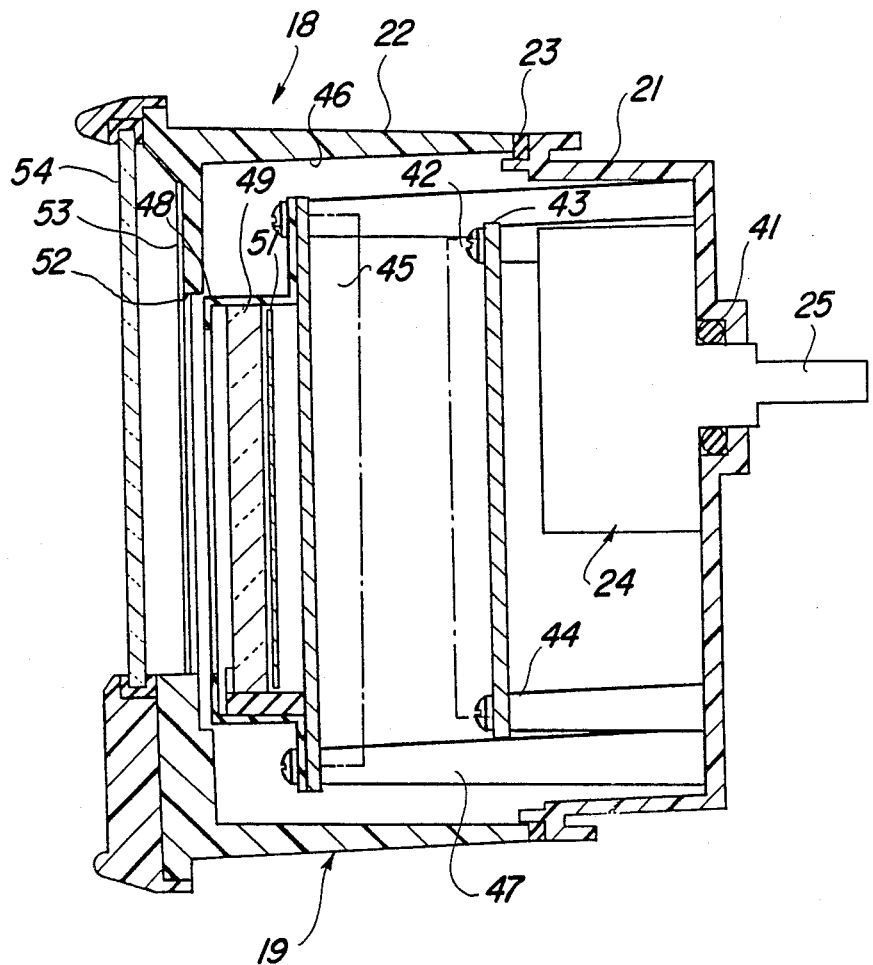
FIG. 2 is a large cross-sectional view showing the speedometer head.

Referring now primarily to FIGS. 2 through 4, the transducer, indicator 18 is comprised of an outer housing assembly, indicated generally by the reference numeral 19, and comprised of a first part 21 and a second part 22 which have generally facing cup shapes and are affixed to each other in a suitable manner with an interposed gasket 23 so as to provide good sealing.

A pressure transducer arrangement, indicated generally by the reference numeral 24 is provided within the housing portion 21 and has an inlet nipple 25 that communicates with the conduit 17 so that pressure may be supplied through a passage 26 to a pressure responsive semi-conductor device 27. An impervious tarrier 28 is positioned between the passage 26 and the pressure sensitive device 27 so as to permit the transfer of pressure but so as to preclude leakage.

The transducer 27 is associated with a circuit board 29 by means of conductors 31 and 32 so as to provide an output signal through a wire assembly 33. It should h noted that the transducer 27 is contained within an outer housing 34 and specifically within a cavity 35 of the outer housing 34. An internal plate 36 defines the cavity 35 and the cavity 35 is vented to the atmosphere through a vent tube 37 and a cylindrical air path 38 that is formed between a lower face of the housing 34 and the outer housing member 21. An atmospheric vent passage 39 completes the venting of the chamber 35 to the atmosphere. This arrangement insures that the chamber 35 will always experience atmospheric pressure while, at the same time, precluding leakage.

Annular gasket 41 is interposed also between the housing 34 and the outer housing 21 around the nipple 25 so as to insure effective sealing.

The pressure transducer 27 outputs a signal through the conductors 33 that is indicative of pressure. This signal is then processed by a computer circuit 42 formed on a mounting board 43 that is affixed to bosses 44 of the housing piece 21 so as to convert the pressure signal into a signal indicative of velocity. It should be noted that the pressure e .ted at the opening 16 will be depended upon the velocity of the watercraft and this relationship can be plotted and fed into the computer circuit 42 so as to provide an output signal indicative of velocity.

The output signal from the computer circuit 42 is transferred through conductors to a display circuit 45 that is mounted on a circuit board 46. The circuit 46 is supported on bosses 47 of the housing member 21 in proximity to the circuit board 43 and computer 42. As a result, there is an extremely sort electrical path between these two circuits and a high degree of accuracy results.

The circuit 43 transmits the speed signal into a driving signal for operating a liquid crystal indicator 48 that is mounted on an illuminating light inducing panel 49 over a reflective panel 51 so as to provide a speed indication through a window 52 formed in a front face 53 of the outer housing member 22. A sight glass 54 covers this opening so as to provide sealing.

From the foregoing description it should be readily clear that the device operates to provide a highly effective speed signal for the watercraft 11 and wherein electrical signals are transmitted over extremely short distances. As a result, the indicator 18 can be used with a wide variety of watercraft with a high degree of accuracy and repeatability. Although an embodiment of the invention has been illustrated and described, various changes and modifications may be made without departing from the spirit and scope of the invention, as defined by the appended claims.

We claim:

1. A water speed indicator for a watercraft comprised of a hull, means carried by said hull for defining an opening to receive water pressure generated by the movement of said hull through the water, conduit means for transmitting said water pressure from said opening to a remote position, and a combined sensor indicator element comprised of an outer housing having a front face secured to a cup shaped member having a rear wall and defining an internal cavity, a pressure transducer supported within said internal cavity of said outer housing forwardly of said rear wall of said cup shaped member, a pressure fitting communicating at one end with said pressure transducer forwardly of said rear wall and extending through said rear wall for communication with said conduit means for generating an electrical output signal from said pressure transducer indicative of pressure, electrical circuit means within said cavity of said outer housing for converting said electrical output pressure signal into a velocity signal, and means within said cavity of said outer housing in proximity to said front face for displaying water velocity in response to said velocity signal.

2. A water speed indicator as set forth in claim 1 wherein the pressure transducer supplies an electrical signal in response to variations in pressure and the means for converting the pressure signal into the velocity comprises an electrical computer circuit.

3. A water speed indicator as set forth in claim 1 wherein the means for displaying water velocity comprises a liquid display crystal.

4. A water speed indicator as set forth in claim 3 wherein the pressure transducer supplies an electrical signal in response to variations in pressure and the means for converting the pressure signal into the velocity comprises an electrical computer circuit.

* * * * *